Patented Feb. 26, 1929.

1,703,391

UNITED STATES PATENT OFFICE.

FRITZ ECKERT, OF ESSEN, GERMANY, ASSIGNOR TO THE FIRM SENDLINGER OPTISCHE GLASWERKE G. M. B. H., OF BERLIN-ZEHLENDORF, GERMANY.

RÖNTGEN TUBE.

No Drawing. Application filed August 5, 1924, Serial No. 730,278, and in Germany August 13, 1923.

It is generally supposed that the efficiency of Röntgen tubes, particularly those intended for internal therapeutic purposes and adapted to produce intensive radiation depends upon the use of a sort of glass which develops or separates but little gas and which is endowed with a high softening point, that is to say, which becomes soft only at high temperature in order to allow of exhausting the air from the tube at a highest possible temperature.

For the above reason it has been customary heretofore to employ for the stated purpose a kind of glass which is adapted to resist high physical and chemical strain, preferably the glass which is known on the German market as "Thüringer Geräteglas" (Thuringia glass for apparatus), and, in order to obtain a maximum efficiency, to manufacture a special sort of glass of a very high softening point or value and of a high capacity of chemical resistance, and to use such glass in spite of its more difficult fashioning.

Now I have discovered that the efficiency of a Röntgen tube to be worked under high strain, that is to say, with high voltage and amperage, depends mainly, as far as the glass structure is concerned, upon the electric properties inherent in the glass and not upon the surface properties thereof, and that consequently it is possible to make Röntgen tubes of best quality and of highest efficiency which are rather superior to that of the tubes hitherto produced, from a sort of glass that has a low softening point or value and a low resistive capacity to atmospheric influences, for instance a glass belonging to the so-called hydrolytic class V according to the terminology appearing from Dralle-Keppeler, "Die Glasfabrikation", 2nd edition, München-Berlin, Volume I, pages 67 and 68.

I accomplish this object, according to my invention, by employing in a normal alkali-lime-alumina-silicate-glass batch, more or less rare earths, particularly cerite earth, in substitution for lime. The glass thus produced retains and preserves its particular properties, as regards the treatment by the glassmaker's pipe or lamp, and at the same time allows of applying, in case of a Röntgen tube made therefrom, tensions of 220 kilo volts and still more.

For exemplification's sake the composition of this new sort of glass may be as follows:

| | Per cent. |
|---|---|
| $SiO_2$ | 70 |
| $Al_2O_3$ | 2 |
| $MgO$ | 3 |
| $Me_2O_3$ | 5 |
| $Na_2O$ | 20 | it being understood that $Me_2O_3$ means cerite or any other rare earth.

In lieu of rare earths oxides of certain elements may be used with good success which, as regards their constitution, are similar to the rare earths. The elements which are available for the purpose of the invention in suitable combination are those which lie in the periodic system between the ordinal numbers 20 and 30, to wit, scandium, titanium, vanadium, chromium, manganese, iron, cobalt, nickel and copper, preferably however titanium and vanadium.

Additions of the hereinbefore stated kind for the purpose of enhancing the useful properties of a frit or glass for use in making Röntgen tubes, however, cannot exert the desired advantageous effect unless they are in fact a constituent part of the glass. Consequently it is absolutely necessary to not go below a certain percentage say 1 p. c. of the total mass.

What I claim is:—

1. As a new article of manufacture, a Röntgen tube made of glass containing a rare earth as one of its constituents and having a relatively low melting point to make it adapted to be easily worked and fashioned.

2. As a new article of manufacture, a Röntgen tube having a glass bulb of a low softening point containing cerium oxide as one of its components.

In testimony whereof I have signed this specification.

DR. FRITZ ECKERT.